Nov. 12, 1974  M. J. MARCHITTO ET AL  3,847,824
SOLID STICK LUBRICANT FOR TAPPING HOLES
Filed March 13, 1970
FIG.1
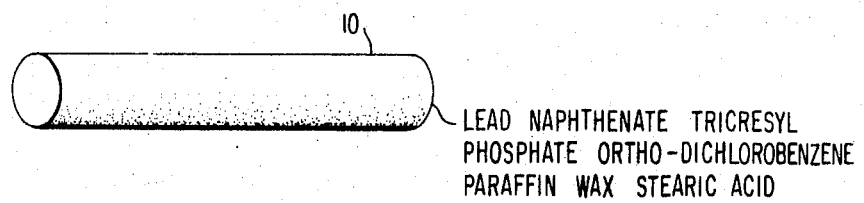
LEAD NAPHTHENATE TRICRESYL PHOSPHATE ORTHO-DICHLOROBENZENE PARAFFIN WAX STEARIC ACID
FIG.2
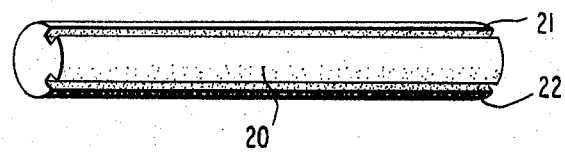
FIG.3
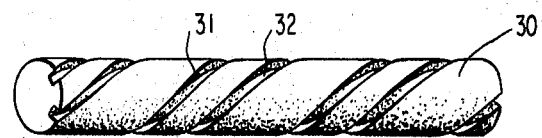
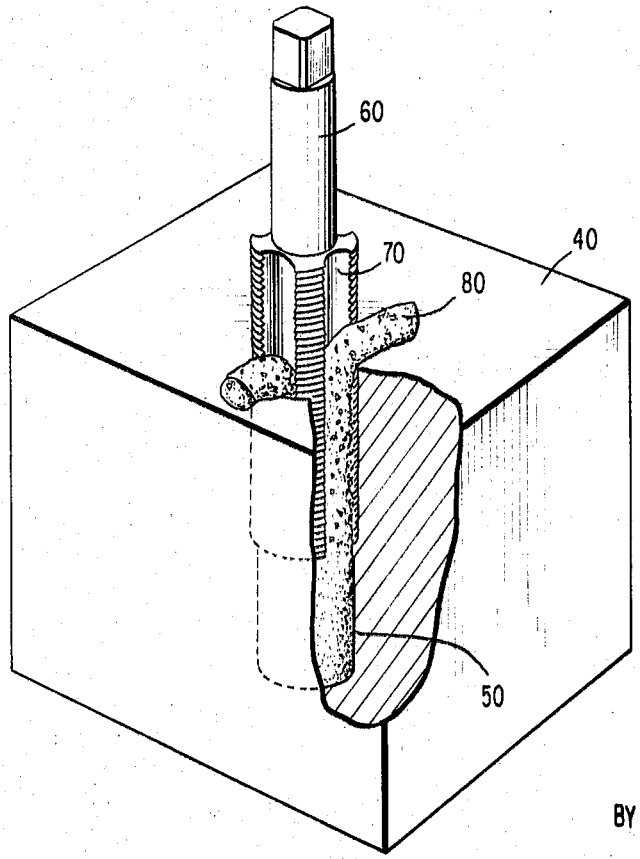
FIG.4
INVENTORS
MICHAEL J. MARCHITTO
VINCENT J. LANDRISCINA, JR.
BY *Brady, O'Boyle & Gates*
ATTORNEYS United States Patent Office 3,847,824
Patented Nov. 12, 1974

3,847,824
SOLID STICK LUBRICANT FOR TAPPING HOLES
Michael James Marchitto, 6550 SW. 10th St., and Vincent James Landriscina, Jr., 721 SW. 64th Way, both of Pembroke Pines, Fla. 33023
Filed Mar. 13, 1970, Ser. No. 19,323
Int. Cl. C10m 5/12, 5/18, 5/24
U.S. Cl. 252—12
10 Claims

ABSTRACT OF THE DISCLOSURE

Solid stick or paste lubricating composition comprising:
(a) Mineral oil base,
(b) Lead naphthenate,
(c) Tricresyl phosphate,
(d) o-dichlorobenzene,
(e) hydrocarbon wax, and
(f) higher fatty acid.

BACKGROUND OF THE INVENTION

Lubricating materials used in metal machining or cutting operations serve to reduce the temperature of the cutting edge of the tool, lubricate the tool and the work in order to reduce tool wear, prevent the welding of chips to the tool, improve the surface finish and remove chips. In most machining operations, one or more of a wide variety of cutting fluids such as soluble oils, lard oils, mineral oils, and sulphurized and chlorinated oils will be suited to a particular material and/or cutting operation. It is important in most such cutting operations to supply as much fluid as possible, without interruption, to the cutting edge of the tool and to allow the fluid to flow away as freely as possible.

There are, of course, a wide variety of metal cutting machines in use, including: (1) turning machines, e.g. lathes, boring mills, etc.; (2) surface cutting machines, e.g. shapers, planers, etc.; (3) milling machines; (4) saws; (5) grinding machines; and (6) drilling and tapping machines. Whereas an efficient cutting fluid supply system can be conveniently designed for or adapted to a machine, the above described cutting fluids may be relied upon as acceptable lubricating materials. On machines that are not easily or conveniently adaptable for the required supply of cutting fluids, attention must be given to other lubricating materials and means.

Jig tapping machines are an example where other lubricating materials and means have commanded a great deal of attention. In jig tapping operations, taps are continuously revolving and jigs holding the work pieces are constantly being placed and withdrawn. In both vertical and horizontal tapping operations, the supply of fluid into the hole being tapped is difficult to accomplish. The tap is designed to force chips out of the hole as the tap advances. This design also forces the cutting lubricant out of the hole and the consequent lack of lubrication contributes to poor tap life, high scrap rates and poorly cut threads. The problem is particularly severe in the tapping of blind holes, i.e. where threads must be cut into the walls of a drilled hole which does not extend completely through the work piece. Prior art cutting fluids and lubricants have not offered a convenient solution to such machining operations.

SUMMARY OF THE INVENTION

It is the general object of this invention to provide a lubricant for difficult cutting or machining operations.

It is another object of this invention to provide a solid lubricant means that can be easily and conveniently used in the tapping of blind holes with improved tap life and threads and reduced scrap rates.

Yet another object of this invention is to provide an improved method of tapping blind holes.

Briefly, the foregoing and other objects of this invention are obtained by providing a lubricant-additive composition containing the compounds lead naphthenate, tricresyl phosphate and ortho-dichlorobenzene. Minor but effective amounts of the compounds are combined with a major proportion of a petroleum product vehicle, which may be a mineral lubricating oil, to form the lubricant-additive. The lubricant-additive may be added to a variety of lubricating compositions to improve their performance. More specifically, the lubricant-additive is admixed with a solid vehicle, e.g. paraffin wax and stearic acid to form a solid lubricant particularly suited for difficult cutting operations such as tapping blind holes. In the form of a solid stick or rod, the solid lubricant is inserted into the blind hole. As the tap descends cutting threads, the metal chips are captured by the lubricant and are carried out along the flutes of the tap.

BRIEF DESCRIPTION OF THE DRAWINGS

For a better understanding of the invention, reference may be made to the accompanying drawing in which:

FIG. 1 is a perspective view of a solid lubricant stick or rod of this invention;

FIGS. 2 and 3 are perspective views of a solid lubricant stick or rod having grooves in the exterior surfaces thereof; and FIG. 4 is an exploded perspective view, partially broken away, illustrating a tap descending into a blind hole containing the solid lubricant.

DESCRIPTION OF THE PREFERRED EMBODIMENT

It has now been discovered that petroleum lubricants may be improved by the addition thereto of minor amounts of the compounds lead naphthenate, tricresyl phosphate and o-dichlorobenzene. The combination of the compounds lead naphthenate, tricresyl phosphate and o-dichlorobenzene may be combined with a major proportion of a liquid vehicle to form a "lubricant-additive" that may be conveniently blended with petroleum lubricants to improve the film strength, stability at relatively high temperatures, the cleaning characteristics and ability to hold particles in suspension. Compositions containing the lubricant-additive are advantageously employed as metal-cutting lubricants. Compositions that can be conveniently made into sticks or rods are especially suited for use in tapping blind holes.

The vehicle of the lubricant-additive may itself be a petroleum lubricating oil (new or reconstituted lubricating oil) or it may be other petroleum fractions such as kerosene or a mixture of kerosene and ligroin in a volume ratio of about 6:1. The individual compounds may be present in amounts varying from about 2–10 percent, by volume, the remaining 70–96 percent constituting the vehicle. The proportion of one compound to another is not critical although approximately equal amounts of each is preferred. It is, however, essential to have each of the three compounds present in the lubricant-additive and preferably in amounts of about 5 to about 10 percent of each compound. It should be noted that each of the compounds is either liquid at room temperature or liquifiable at relatively low temperatures. The lead naphthenate may be most conveniently employed in the commercial grade containing 24 percent Pb. This grade has been cut with oil and is sufficiently fluid at room temperature to be poured out of drums. Grades containing larger percentages of Pb (e.g. 34 or 37 percent Pb) may be employed but significant heating may be required for mixing since they do not readily flow at room temperature. Herein, the term lead naphthenate, unless otherwise specified, is intended to designate the 24 percent Pb grade. When desirable, however, proportionally smaller amounts of the grades containing greater amounts of Pb could be used or conversely. Proportionally larger amounts of grades containing less than 24 percent Pb could be used.

A commercial grade of tricresyl phosphate and o-dichlorobenzene may also be employed and it should be understood that minor amounts of typical impurities may be present. The o-dichlorobenzene may, for example, contain small amounts of the m, p-isomers.

A lubricant-additive composition is prepared by mechanically blending, on a volume basis, 8½ percent lead naphthenate, 8½ percent tricresyl phosphate, 5¼ percent o-dichlorobenzene and 77¾ percent of an SAE 90 mineral cylinder oil (Texaco 650T). An oil soluble aniline dye may be added if a more attractive appearance is desired. There is no critical sequence for adding the ingredients and heating is not required at normal room temperatures. At colder temperatures, the mineral cylinder oil may require mild heating.

The lubricant-additive composition may itself be used as a lubricant, e.g. as a lubricant for worm gear drives or other applications involving severe metal to metal sliding pressures so that extreme pressure lubricants are necessary. The lubricant-additive composition is itself particularly suited for use as a lubricant in the variety of machining or metal cutting applications heretofore enumerated. The lubricant-additive composition may be further embodied to provide a paste solid (semi-solid) or a self-supporting solid lubricating stick or rod.

The paste may be prepared by stirring together and heating the lubricant-additive with a wax and a fatty acid (long chain, 10–22 carbons) or a mixture of fatty acids, preferably predominating in stearic acid and its nearest homologs. Three gallons of the above-described lubricant-additive (about 24 pounds) is mixed, heated and stirred with 50 pounds of a paraffin wax having a melting point of 130°–160° F. and 50 pounds of stearic acid in flake or block form. (The melted paraffin has a liquid volume of about 8 gallons; the stearic acid about 8 gallons.) The ingredients are heated to 250 to 300° F. and thoroughly blended by slow stirring. Cooled to a solid state, the viscous paste may be applied from a pressure gun to work articles being drilled, tapped, sawed, etc.

Referring now to FIG. 1, the self-supporting solid rod or stick lubricant 10 is molded or extruded from a composition prepared by stirring together and heating to 250 to 300° F. one gallon of the above described lubricant-additive, 50 pounds of paraffin wax (M.P. 160–180° F.) and 50 pounds of stearic acid. Drawn off hot, the liquid composition is poured into molds to form the shaped self-supporting rod or stick 10. The mold may have an appropriate shape so that the shaped self-supporting solid rod or stick 20 of FIG. 2 may be made. A plurality of longitudinal grooves 21, 22 may be advantageously formed in the periphery of the rod 20. In FIG. 3, a rod 30 has spiral groves 31, 32 extending in the surface.

Referring now to FIG. 4, a work piece 40 has a drilled blind hole 50 extending into but not through the work piece. A self-supporting solid rod or stick 10 having a diameter about equal to the drilled hole is inserted into the blind hole 50. The stick or rod 10 may be substantially longer than the depth of the hole 50 so that it may be used to fill several holes. A bottoming tap 60 is inserted into the drilled hole 50 and turned therein. As the tap 60 advances, threads, not shown, are cut in the wall of the work piece. The metal chips resulting from the tapping operation are picked up or captured by the lubricant and carried up the flutes 70 and out of the hole as shown by segment 80. Lubrication is provided for the metal to metal contact and the tap is cooled. The grooves 21, 22 of FIG. 2 and 31, 32 of FIG. 3 would permit air to be forced out of the hole 50 when the stick 20 or 30 is inserted.

The residue may be easily removed with conventional solvent cleaners. It should be apparent that the tapping operation is self-cleaning and that the tap may be used repeatedly without cleaning. Reduced scrap, clean cut threads and extended tap life are among the advantages that attend this invention.

The three compounds are effective in metal cutting and other lubricating compositions, when they are present individually in fractional percentages (e.g. 0.1 percent) expressed on the basis of total volume or weight. Again, on both bases, no particular advantage is gained by including the individual compounds in significantly greater quantities than 10 percent each or a total of 30 percent. Compositions containing minor amounts or proportions of the compounds and major amounts or proportions of petroleum products are useful in the invention.

It should also be understood that the rods or sticks may be molded or extruded in various diameters about equal to drill sizes to provide a range of sizes suited for common tap drills.

We claim:

1. A solid lubricant composition comprising a blended admixture of a major proportion of mineral lubricating oil, a minor proportion of the additive compounds: lead naphthenate, tricresyl phosphate and o-dichlorobenzene, each of said additive compounds being present in an amount of at least 0.1 percent by weight and sufficient amounts of hydrocarbon wax and higher fatty acid to provide a solid composition.

2. A semi-solid paste lubricant composition comprising a blended admixture of a major proportion of mineral lubricating oil, a minor proportion of the addtive compounds: lead naphthenate, tricresyl phosphate and o-dichlorobenzene, each of said additive compounds being present in an amount of at least 0.1 percent by weight and sufficient amounts of hydrocarbon wax and higher fatty acid to provide a semi-solid paste composition.

3. The solid lubricant composition of claim 1 wherein each of the additive compounds constitutes from about 2 to 10 percent of the total composition.

4. The solid lubricant composition of claim 1 wherein the fatty acid is stearic acid and the wax is paraffin.

5. The solid lubricant composition of claim 4 wherein the composition contains substantially equal amounts of paraffin wax and stearic acid.

6. The solid lubricant composition of claim 1 wherein each of the additive compounds constitutes from about 5 to about 10 percent based on the volume of the additive compounds and said mineral lubricating oil.

7. The semi-solid paste lubricant composition of claim 2 wherein each of the additive compounds constitutes from about 2 to 10 percent of the total composition.

8. The semi-solid past lubricant composition of claim 2 wherein the fatty acid is stearic acid and the wax is paraffin.

9. The semi-sold paste lubricant composition of claim 8 wherein the composition contains substantially equal amounts of paraffin wax and stearic acid.

10. The semi-solid paste lubricant composition of claim 2 wherein each of the additive compounds constitutes from about 5 to about 10 percent based on the volume of the additive compounds and said mineral lubricating oil.

References Cited

UNITED STATES PATENTS

| | | | |
|---|---|---|---|
| 2,388,779 | 11/1945 | Boehmler | 252—12 |
| 1,100,335 | 6/1914 | Williamson | 252—12.2 |
| 3,507,677 | 4/1970 | Maynard | 252—12 |
| 3,558,511 | 1/1971 | Rueping | 252—12 |
| 3,592,783 | 7/1971 | Edmonds | 252—12 |
| 2,276,341 | 3/1942 | Prutton | 252—37.2 |
| 2,354,171 | 7/1944 | Morgan | 252—37.2 |
| 2,367,355 | 1/1945 | Kaufman et al. | 252—37.2 |
| 3,516,933 | 6/1970 | Andrews et al. | 252—37.2 |

DANIEL E. WYMAN, Primary Examiner

I. VAUGHN, Assistant Examiner

U.S. Cl. X.R.

252—37.2